Oct. 26, 1926.   1,604,555
W. J. HOLLAND
DISK BIT
Filed March 13, 1923
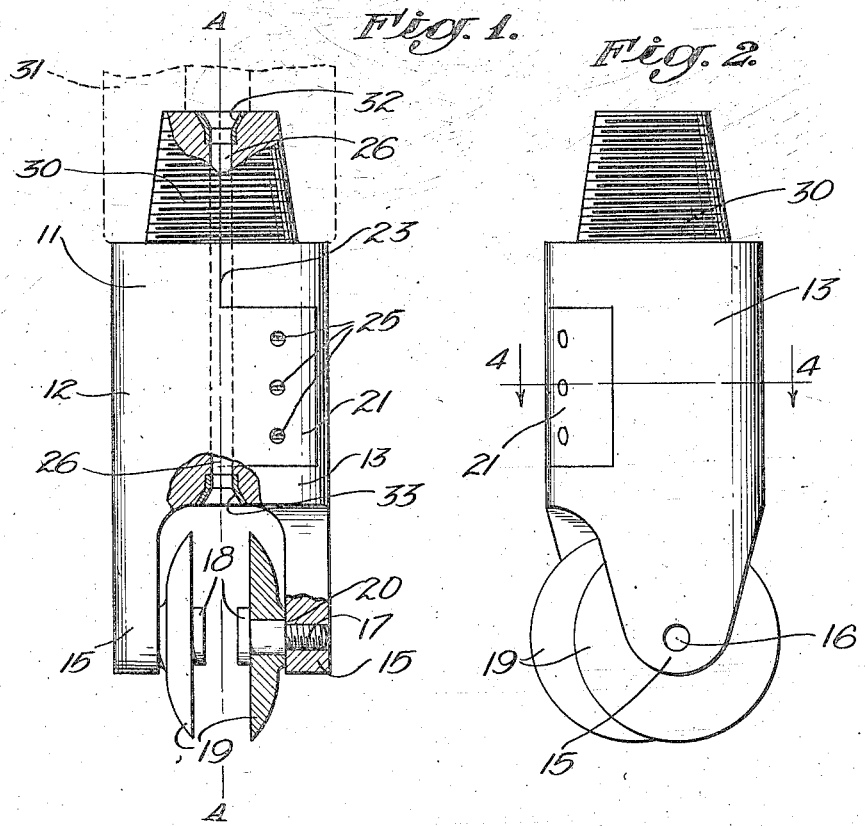
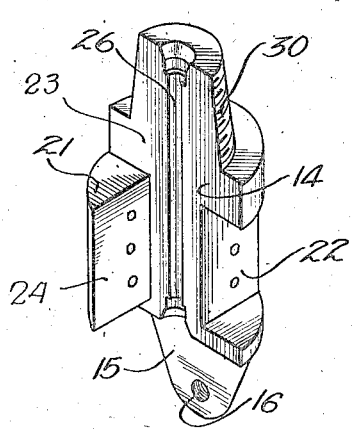
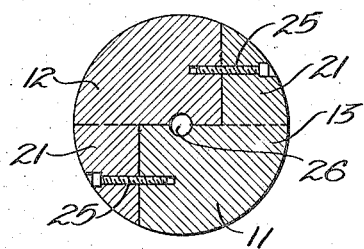
INVENTOR:
WALTER J. HOLLAND,
BY
Graham + Davis
ATTORNEYS.

Patented Oct. 26, 1926.

1,604,555

UNITED STATES PATENT OFFICE.

WALTER J. HOLLAND, OF LOS ANGELES, CALIFORNIA, ASSIGNOR TO ROTARY DISC BIT CO., A CORPORATION OF CALIFORNIA.

DISK BIT.

Application filed March 13, 1923. Serial No. 624,785.

My invention relates to devices used for drilling oil and water wells and commonly known as bits and more particularly to what is known as a disk bit. In the standard form of disk bit, now used in the oil fields, a pair of disks, each mounted on a suitable pin are mounted on projections extended downwardly from a body, these disks being free to turn on the pin and thus provide an extensive cutting edge.

It is an object of my invention to provide a novel form of construction in such a bit by means of which the disks can be readily and firmly secured in place and which will be in itself very rigid.

A further object of the invention is to provide a form of body which can be readily machined.

Further objects and advantages will be made evident hereinafter.

Referring to the drawings which are for illustrative purposes only:

Fig. 1 is a side elevation of a bit embodying my invention.

Fig. 2 is an elevation viewed at right angles to Fig. 1 of the body members.

Fig. 3 is a perspective view of one of the members.

Fig. 4 is a section on a plane represented by the line 4—4 of Fig. 2.

In the form of my invention illustrated in these drawings, 11 is a body made up of body members 12 and 13, which in the embodiment shown are duplicates of each other, the form of which can be readily understood from examination of Fig. 3, which is a perspective view. The members 12 and 13 are each provided with a projection 15, each of which extends downwardly from the body 11 and is provided with a tapped hole 16, in which a pin 17 may be secured. The pins 17 have enlarged heads 18 and support disks 19, which are free to rotate on the pins 17 inside the projections 15.

In Fig. 1 it will be noted that the right hand disk is shown in section and that the pin 17 is shown having an enlarged bearing inside the disk 19, terminating in a shoulder 20, this shoulder abutting against the inside of one of the projections 15.

It will be evident from an inspection of Fig. 1 that if the body 11 were made in one piece, the pins 17 could not be secured in place in the manner shown, and it may also be pointed out that by placing the disks 19 inside the projections 15, a very rigid form of bit is provided.

For the purpose of making it possible to place the disks 19 and pins 17 in place as shown, the body 11 is split on a central plane represented by the line A—A, Fig. 1, lugs 21 being provided, these lugs each provided with an arcuate outer surface setting in recesses 22, formed in the other member.

Each of the members 12 and 13 is therefore provided with a main bearing surface 23, which is along the plane A—A and with an auxiliary bearing surface 24, which is along the face of the lug or projection 21. Bolts 25 are provided passing through each of the lugs 21 into the other body member. A cylindrical opening 26 extends downwardly through the center of the bit for the purpose of conducting a fluid under pressure to the working cavity between the projections 15. On the upper end of each of the body members 12 and 13 is a half pin 30 which is preferably tapered and of conoidal form. This pin is threaded and is used to attach the bit to the lower end of a string of drill pipe by means of a suitable collar or tool joint 31 shown in dotted lines in Fig. 1 which also serves to hold the two members 11 and 12 together and to thus reinforce the action of the lugs 21.

In assembling the device, the pins 17 and disks 19 are each secured in place on their respective body members 12 and 13, and the two halves 12 and 13 of the body 11 are then bolted together by the bolts 25. The lugs 21 not only serve to lock the parts together, but also serve to accurately align the members 12 and 13 with relation to each other since the surfaces 23 register accurately in one direction and the surfaces 24 register accurately in a direction at right angles thereto. Since the lugs 21 fit tightly in the recesses 22, they prevent any vertical displacement between the two halves.

To aid in the distribution of water into the working cavity of the bit, I insert flanged bushings 32 and 33 into the ends of the water channel 26.

I claim as my invention:

In a well drilling device having rotary drilling elements, the combination of: two members adapted to be joined to form a body having two downwardly extending projections, one of said projections carrying one of said elements and the other of said projections carrying the other of said elements, each of said members having formed integral therewith a lug with an arcuate outer surface completing in part the exterior surface of the member and a flat auxiliary bearing surface, fitting in and secured in a recess formed in the outer face of the other of said members, each of said members having a main bearing surface in which the main vertical axis of the device lies, and each of said lugs having its auxiliary bearing surface at a dihedral angle relatively to said main bearing surface.

In testimony whereof, I have hereunto set my hand at Los Angeles, California, this 7th day of March 1923.

WALTER J. HOLLAND.